United States Patent [19]

Tabata et al.

[11] 4,418,265

[45] Nov. 29, 1983

[54] DEVICE WITH HIGH FREQUENCY CONTACTLESS TYPE ARC GENERATING MECHANISM

[75] Inventors: Yoichiro Tabata; Shigeo Ueguri; Hirotsugu Komura, all of Amagasaki; Toshio Ito, Nagoya, all of Japan

[73] Assignee: Mitsubishi Denki Kabushiki Kaisha, Tokyo, Japan

[21] Appl. No.: 239,926

[22] Filed: Mar. 3, 1981

[51] Int. Cl.$^3$ .............................................. B23K 9/06
[52] U.S. Cl. .................................................. 219/130.4
[58] Field of Search ...................... 219/130.4; 336/175

[56] References Cited

U.S. PATENT DOCUMENTS

| | | | |
|---|---|---|---|
| 2,594,890 | 4/1952 | Ellwood | 336/175 |
| 2,764,668 | 9/1956 | Dumoulin | 219/130.4 |
| 2,898,516 | 8/1959 | Volff | 219/130.4 |
| 3,414,656 | 12/1968 | Lünig | 336/175 |
| 3,444,430 | 5/1969 | Needham | 219/130.4 |
| 3,614,694 | 10/1971 | Koontz | 336/175 |
| 3,678,341 | 7/1972 | Constable | 336/175 |

FOREIGN PATENT DOCUMENTS 54-114451 9/1979 Japan ............................. 219/130.4

Primary Examiner—C. C. Shaw
Attorney, Agent, or Firm—Sughrue, Mion, Zinn, Macpeak & Seas

[57] ABSTRACT

An electrical welding device which requires no high frequency insulation and an electrical discharge gap for maintaining the arc discharge is made large. A main power source supplies an arc discharge current through an electrical conductor to the welding electrode. A high frequency electric power source applies a high-frequency high voltage between the electrode and the material to be welded to generate a high frequency discharge for arc ignition in the electric discharge gap. A high frequency magnetic choke element, which is preferably a plurality of stacked annular ferrite discs, surrounds a predetermined part of the electrical conductor. A high-frequency bypass capacitor is utilized to ground the electrical conductor between the magnetic choke element and the main power source.

8 Claims, 5 Drawing Figures

DEVICE WITH HIGH FREQUENCY CONTACTLESS TYPE ARC GENERATING MECHANISM

BACKGROUND OF THE INVENTION

The present invention relates to welding devices such as a MIG welding machine, a TIG welding machine, an arc fusing type cutter, a fusing type cutter or an electric discharge machine in which a material is processed using an arc discharge, specifically, a machine of this type in which a high frequency electric source is employed to generate arcs contactlessly.

By way of example, a MIG welding machine will be described. In general, in a MIG welding machine, a wire-shaped electrode (hereinafter referred to as "a wire electrode" when applicable) is fused by the heat of electrical arcing or Joule heating into molten metal drops which are transferred onto a base material.

In a conventional MIG welding machine, the generation of an arc is carried out by bringing the wire electrode into contact with the base material momentarily to cause a shortcircuit current which heats and melts the wire electrode. The molten metal is scattered in the form of particles. The molten metal particles thus scattered may adhere to the surface of the base material. If this happens, it is necessary to remove the molten metal particles from the base material surface which operation decreases the overall work efficiency of the welding procedure.

This difficulty may be eliminated by utilizing with the MIG welding machine a contactless type arc generating mechanism using a high frequency electric source such as is employed in a TIG welding machine.

FIG. 1 shows the arrangement of a MIG welding machine so modified. In FIG. 1, reference numeral 1 designates a base material, 2 a torch, 3 a welding power source, 4a and 4b current supplying wires extending from the welding power source 3, and 5 a high frequency source composed of a series circuit including an oscillating coil 51, discharge gaps 52 and 53 and a high frequency oscillating capacitor 54. The high frequency source 5 oscillates, for instance, at 3 MHz when a high voltage is applied across terminals 55 by a high voltage source (not shown). A coupling coil 41 is formed by the current feeding wire 4 and it is coupled to the oscillating coil 51 so that, for instance, a high voltage of 5 KV is induced across the coupling coil 41. A high frequency bypass capacitor 6 is provided for the protection of the welding powder source 3. A wire electrode 8 (hereinafter referred to merely as "a wire 8" when applicable) is wound on a reel 7. A wire supplying unit 9 is made up of a driving motor 91, a drive roller 92 driven by the driving motor 91, and a wire depressing roller 93 adapted to press the wire 8 against the drive roller 92. The wire supplying unit 9 is controlled by a control device (not shown) to feed the wire 8 to the torch 2 at a rate corresponding to the particular welding conditions. In FIG. 1, reference character 8a designates the end portion of the wire electrode which protrudes from the torch 2. (The end portion will hereinafter be referred to as "electrode 8b" when applicable.) The wire 8 is inserted through a guide pipe (not shown), which is juxtaposed with the current feeding wire 4a, and into the torch 2 where electrical contact is made with the wire 8.

The operation of the MIG welding machine thus constructed will be described. In starting an initial arc, the high frequency electric source 5 is operated so that the output high frequency voltage of the high frequency electric source 5 causes a high frequency discharge between the electrode 8a and the base material 1. In response to the occurrence of the high frequency discharge, current is supplied from the welding power source 3 to generate and maintain an arc 10. The wire 8 from the reel is fed by the wire supplying unit 9. The electrode 8b is fused by the arc 10 thus generated and the base material 1 is welded along the welding line with the molten metal drops 8b formed from the electrode 8.

As was described above, a contactless type arc generating mechanism using a high frequency electric source, which is employed in a TIG welding machine, can be applied to a MIG welding machine. However, as the high frequency voltage is applied directly to the wire 8, it is necessary to electrically insulate the wire supplying unit 9 and the reel 7, that is, to provide a high frequency insulation treatment for these members so that they can sufficiently withstand the high voltage of high frequency.

SUMMARY OF THE INVENTION

Accordingly, an object of the invention is to prevent the application of a high frequency voltage to a welding device with a contactless type arc generating mechanism using a high frequency electric source and also to prevent application thereof to the power source of the welding device.

Another object of the invention is to provide a welding device with a high frequency, contactless type arc generating mechanism in which the application of a particular high frequency insulation treatment is unnecessary and high frequency insulation is effected with a mechanism simple in construction and low in manufacturing cost.

A further object of the invention is to provide a device with a high frequency, contactless type arc generating mechanism in which the arrangement of high frequency insulation means is achieved readily and the size of the device is made small.

A still further object of the invention is to provide a welding device with a high frequency, contactless type arc generating mechanism in which high frequency insulation is effected and an electric discharge gap for maintaining arc discharge can be made large.

A particular object of the invention is to provide a welding device with a high frequency, contactless type arc generating mechanism in which the wire supplying unit, etc. are protected from a high frequency voltage.

The foregoing objects and other objects of the invention have been achieved by the provision of a welding device with a high frequency, contactless type arc generating mechanism which, according to the invention, includes an electrode which confronts a material to be processed therewith through an arc discharge gap, a high frequency electric source for applying an arc generating high frequency voltage between the electrode and the material, a main power source for supplying a processing current, a high frequency magnetic choke element surrounding a predetermined part of an electrical conductor which extends between the high frequency electric source and means for preventing the unwanted application of the output high frequency voltage of the high frequency electric source, and a high frequency bypass capacitor coupled to the side of the means for preventing the unwanted application of the high frequency voltage.

The nature, principle and utility of the invention will become more apparent from the following detailed description when read in conjunction with the accompanying drawings, in which like parts are designated by like reference numerals or characters.

DESCRIPTION OF THE PREFERRED EMBODIMENTS

The invention will be described with reference to preferred embodiments thereof.

Figure 1:
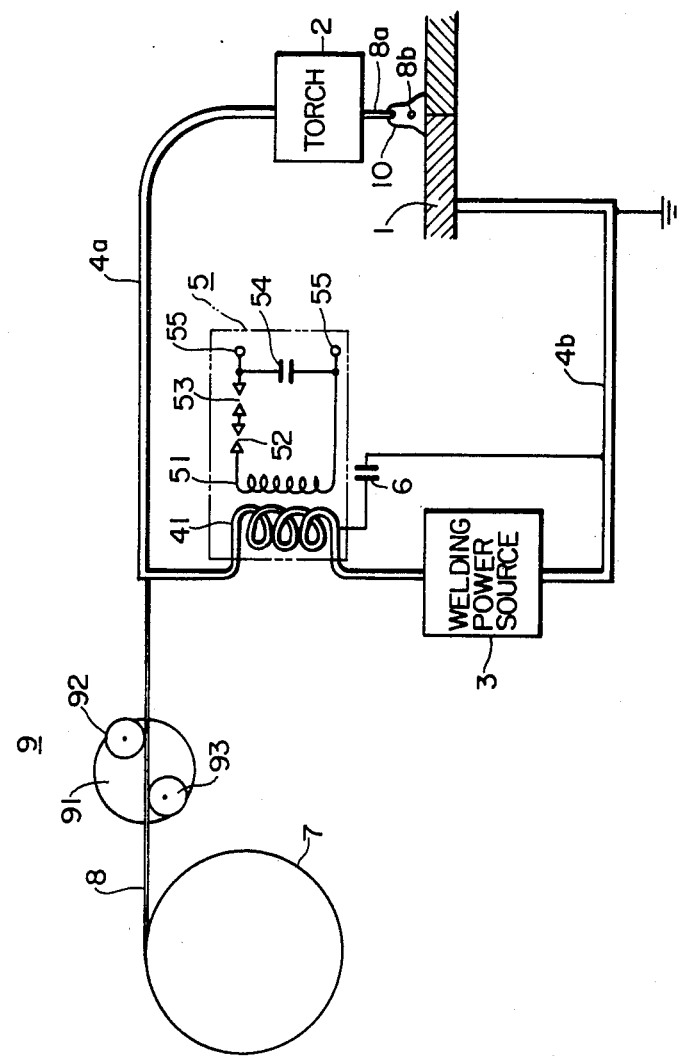
FIG. 1 is an explanatory diagram showing the arrangement of a MIG welding machine to which an arc generating high frequency electric source employed in a TIG welding machine is applied.
Figure 2:
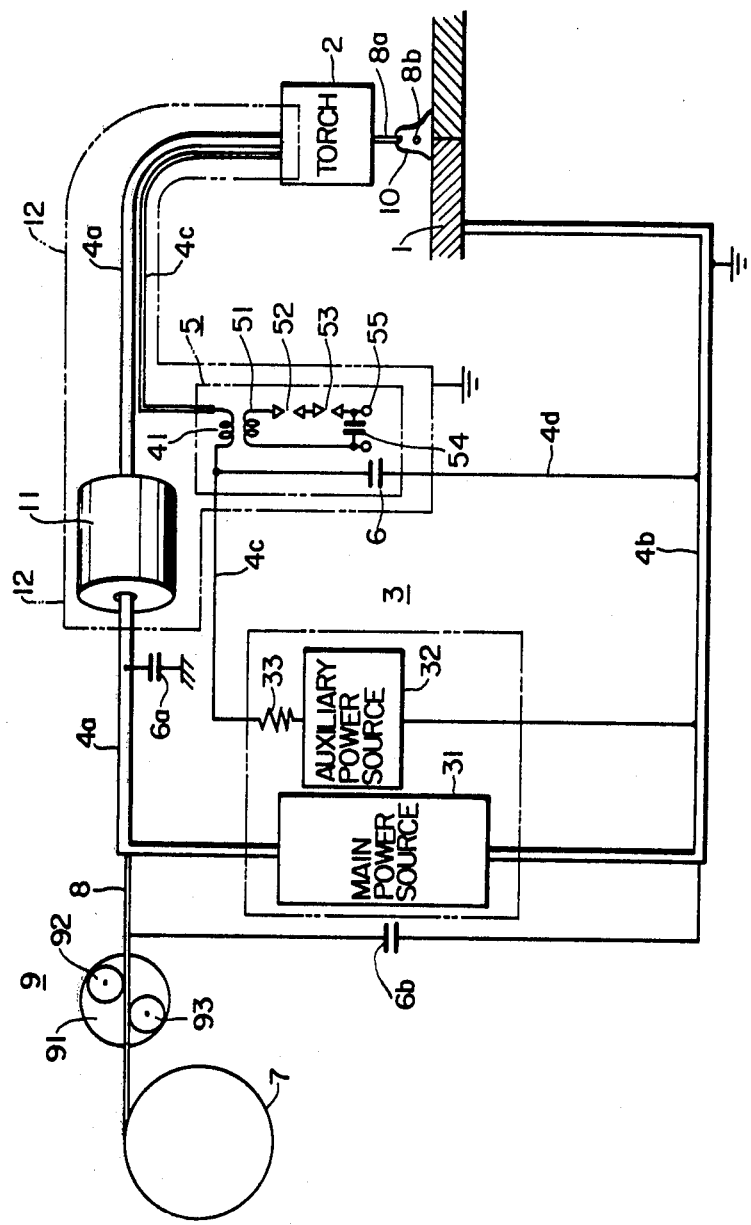
FIG. 2 is an explanatory diagram showing a first embodiment of the invention.

FIG. 2 shows the arrangement of a first preferred embodiment of the invention which is applied to a MIG welding machine. In FIG. 2, those components which have been previously described with reference to FIG. 1 are therefore similarly numbered and their detailed descriptions will be omitted.

In FIG. 2, a welding power source 3 includes a main power source 31 for supplying welding current and an auxiliary power source 32 for supplying a voltage higher than that of the main power source 31 to maintain a welding arc. The main power source 31 is connected through a cable 4b to a material to be welded, i.e. a base material 1, and through a cable 4a to an electrode 8a which confronts the base material 1 through an arc discharge gap. On the other hand, the auxiliary power source 32 is connected through a current limiting resistor 33 and a current feeding wire 4c to a torch 2, and is connected to a high frequency electric source 5 through a coupling coil 41 which is inserted in series in the wire 4c. A high frequency magnetic element in the form of a cylinder made of a high frequency magnetic material (hereinafter referred to as a choke 11 when applicable) has a hole 12 formed therein through which the wire 4a and a wire 8 pass. The choke 11 forms a high frequency reactor. In FIG. 2, reference numeral 12 designates a high frequency shield, 6a a high frequency bypass capacitor which grounds the current feeding wire 4a between the choke 11 and the main power source 31, and 6b a high frequency bypass capacitor which grounds the wire 8 between the choke 11 and a wire supplying unit 9.

When the high frequency electric source 5 is operated in the welding machine thus arranged, a high frequency discharge is caused between the electrode 8a and the base material 1. As a result, first an arc is generated by the auxiliary power source after which welding current from the main power source 31 forms and maintains an arc 10 with which a welding operation is carried out as in a conventional welding machine.

The provision of the auxiliary power source 32 is advantageous in that, as the discharge gap for maintaining the arc 10 can be made large, the arc 10 can be readily maintained.

On the other hand, the high-frequency high voltage which is applied through the torch 2, the current feeding wire 4a and the wire 8 to the main power source 31 and the wire supplying unit 9 is significantly decreased by the action of the choke 11 and the bypass capacitors 6a and 6b. Therefore, it is unnecessary to apply a special high frequency insulation treatment to these components.

Figure 3:
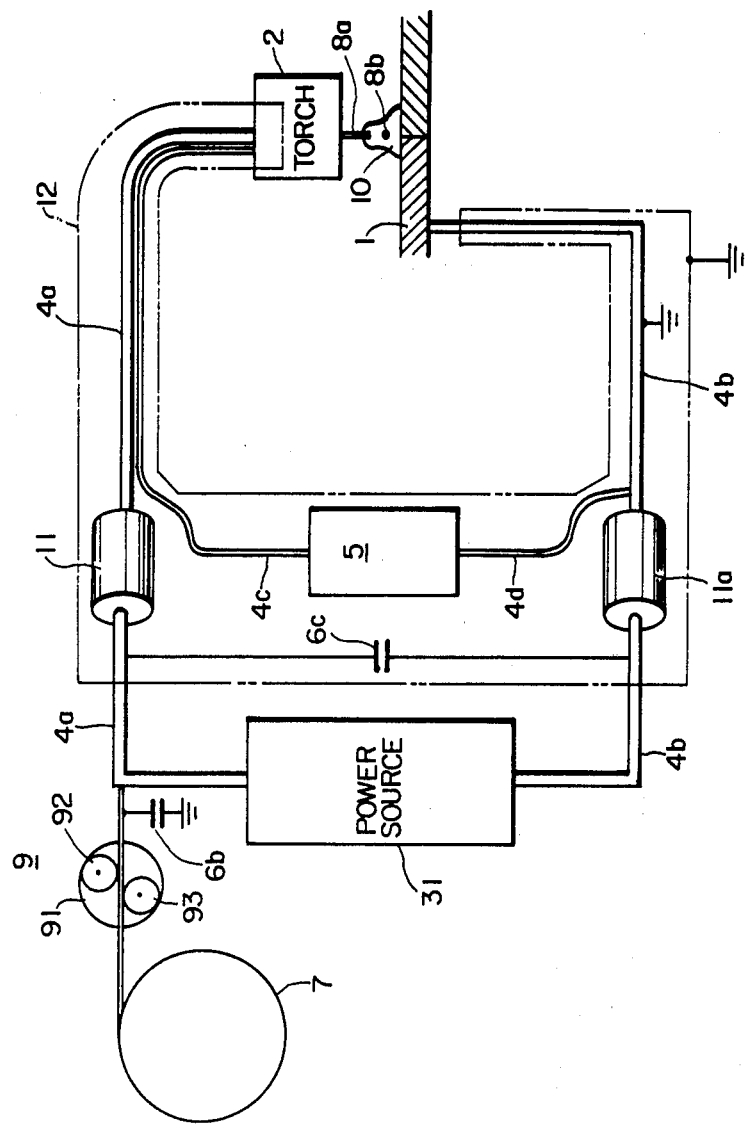
FIG. 3 is an explanatory diagram showing a second embodiment of the invention.

FIG. 3 shows a second preferred embodiment of the invention which, as in the first embodiment in FIG. 2, is applied to a MIG welding machine. In FIG. 3, those components which have been previously described with reference to FIG. 2 are therefore similarly numbered and their detailed descriptions will be omitted.

As is apparent from comparing FIG. 3 with FIG. 2, the welding machine in FIG. 3 is constructed by modifying the welding machine in FIG. 2 as follows. The auxiliary power source 32 is eliminated but the main power source 31 for supplying the welding current is utilized. The high-frequency high voltage is applied directly to the torch 2 by the high frequency electric source 15. In addition, two chokes rather than one, are provided in the circuit.

In FIG. 3, reference character 11a designates a choke coupled to the current feeding wire 4b, and 6c designates a high-frequency bypass capacitor connected between the wires 4a and 4b which extend between the welding power source 31 and the choke 11 and between the welding power source 31 and the choke 11a, respectively.

In the welding machine thus constructed, the ignition of the arc is effected and maintained by the current which is supplied from the welding power source 31 in response to the high frequency discharge caused by the high frequency electric source 5. While the arc is maintained, the welding operation is carried out.

The welding power source 31 is protected from the high frequency high voltage by the chokes 11 and 11a and the bypass capacitor 6c. The wire supplying unit 9 and a reel 7 is protected by the choke 11 and the bypass capacitor 6b. Generally, stoppers can be provided at various points or in a distributed form in the circuit.

One example of the choke, which is one of the specific features of the invention, will be described with reference to FIG. 4.

Figure 4:
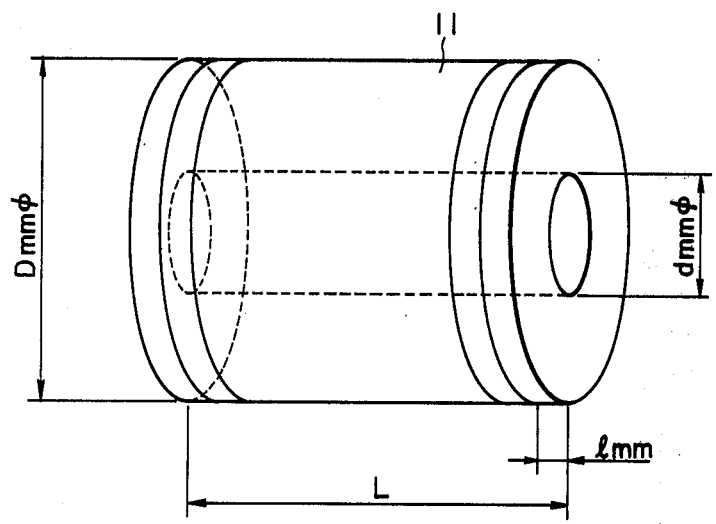
FIG. 4 is a perspective view showing an example of a high frequency magnetic element which forms an essential part of the welding device of the invention.

As shown in FIG. 4, the stopper is fabricated by piling a plurality of annular discs one on another to a length L. Each disc has an outside diameter of D, an inside diameter d, and a thickness of l.

The impedance of the high frequency reactor which is formed by the choke 11 is represented by the following expression:

$$Z = \frac{1}{2\pi} \mu_0 \mu_r \omega L \log \frac{D}{d} \quad (1)$$

where $\mu_0$ is the free-space magnetic permeability ($4\pi \times 10^{-7}$ H/m), $\mu_r$ is the relative permeability of the magnetic material, and $\omega$ is the angular frequency ($1.88 \times 10^7$ rad/sec corresponding to a frequency of 3 MHz of the electric source 5).

Figure 5:
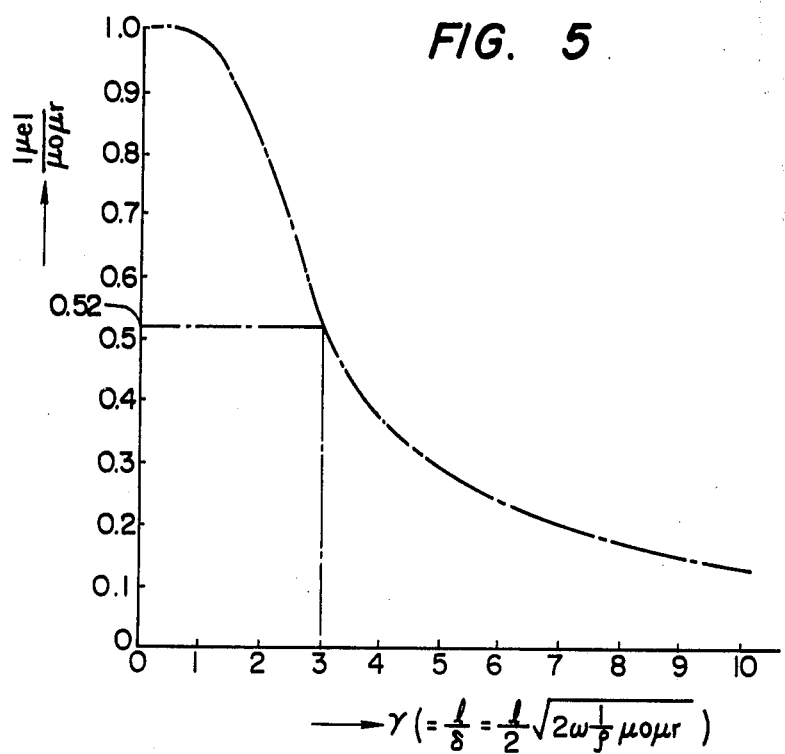
FIG. 5 is a graphical representation indicating high frequency magnetic element thickness with resistivity.

Assuming, for instance that the output frequency of the high frequency electric source 5 is 3 MHz, the output voltage is 5 KV, the required impedance Z of the high frequency reactor is 2KΩ, and the dimensions of the choke are D=40 mm, d=5 mm and L=500 mm, for these values, the relation between the thickness l and the resistivity ρ of a ferrite used is as shown in a characteristic diagram in FIG. 5. For example, if the ferrite's relative permeability $\mu_r$ is 760, then the thickness l is 50 mm. The inside diameter d is set to 5 mm so that the hollow bare copper wire which is employed as the current feeding wire 4a can pass therethrough.

The material of the high frequency reactor is preferably a ferrite magnetic material having a high resistivity. The configuration of the high frequency reactor is determined in accordance with the relevant dimensions of the welding machine and cable with which it is used and from the permissible manufacturing cost. The maximum allowances in dimension of the high frequency reactor are 40 mm in outside diameter, 15 mm in inside diameter and 0.5 m in length. Because of the inherent characteristics of the high frequency electric source 5, it is preferable that the impedance Z of the choke 11 at a frequency of 3 MHz be at least 2KΩ.

Due to the above-described limitations and in view of equation (1), the relative permeability $\mu_r$ should be at least 1100. However, since the relative permeability $\mu_r$ of ferrite material is typically not more than about 5000, the ratio of the outside diameter of the high frequency reactor to the inside diameter must be at least 1.2 as may be determined from expression (1).

The choke 11 has an eddy current effect and a skin effect. Accordingly, as the frequency is increased, the relative permeability $\mu_r$ is decreased. Thus, it is desirable to fabricate the choke 11 by piling a plurality of ferrite discs one one another as shown in FIG. 4 which are electrically insulated from one another.

Decrease of the relative permeability $\mu_r$ due to the eddy current effect and the skin effect will be described. A skin depth δ is represented by the following expression (2):

$$\delta = \sqrt{\frac{2\rho}{2\pi f \mu_0 \mu_r}} \quad (2)$$

where ρ is the ferrite's resistivity, f is the frequency of the applied current, $\mu_0$ is the free space permeability, and $\mu_r$ is relative permeability. It is assumed that $\mu_e$ represents an effective permeability when δ cannot be neglected. Then, as is apparent from FIG. 5, the permeability decreasing ratio ($\mu_e/\mu_0\mu_r$) can be expressed as a function of the ratio r=l/δ of the thickness l of the ferrite to δ. For instance, if r=3, then ($\mu_e/\mu_0\mu_r$) is 0.52 and in this case $\mu_e$ is 0.52 $\mu_0\mu_r$. Accordingly, in order to prevent a decrease of $\mu_e$ (i.e. making $\mu_e$ equal to $\mu_0\mu_r$), it can be understood from FIG. 5 that the ferrite cannot be used effectively without setting r to 1 or less.

In general, the relative permeability $\mu_r$ of commercially available ferrite materials is substantially in reverse proportion to the resistivity ρ. In one particular ferrite material which can be used with the invention, ρ is 100 Ω-cm with $\mu_r$=1100 and ρ=100 Ω-cm. Inserting these in the following expression (3), then the maximum thickness l of the ferrite for making r equal to 1 or less must be 10 mm or less.

$$l \geq \frac{l}{2} \sqrt{4\pi f \frac{1}{\rho} \mu_0 \mu_r} \quad (3)$$

While the invention has been described with reference to preferred embodiments thereof as relate to a MIG welding machine, it should be noted that the invention is not limited thereto or thereby. That is, the technical concept of the invention can be applied an arc discharge machine in which a high frequency electric source is employed to generate arcs contactlessly, such as a TIG welding machine, an arc fusing type cutter or an electric discharge machine with the same advantageous effects.

What is claimed is:

1. A welding device with a high frequency, contactless type arc generating mechanism which comprises:
    a single electrode disposed confronting an electrically conductive material to be processed therewith through an electric discharge gap;
    a main power source for supplying an arc discharge current between said electrode and said material;
    an electrical conductor for coupling said main power source to said electrode;
    a high frequency electric source for applying a high frequency high voltage between said electrode and said material to generate a high frequency discharge for arc ignition in said electric discharge gap;
    a high frequency magnetic choke element surrounding a predetermined part of said electrical conductor between said main power source and said electrode, said high frequency magnetic choke element comprising a plurality of stacked ferrite discs in the form of a cylinder, each of said ferrite discs having a central hole, said electrical conductor passing through said hole; and
    a high-frequency bypass capacitor connected in parallel with said main power source and having one terminal connected to said electrical conductor between said magnetic choke element and said main power source.

2. The device as claimed in claim 1 in which said high frequency magnetic choke element comprises a ferrite material.

3. The device as claimed in claim 2 in which said high frequency magnetic choke element comprises a plurality of stacked ferrite discs in the form of a cylinder, each of said ferrite discs having a central hole.

4. The device as claimed in claim 1 in which said high frequency bypass capacitor has a second terminal coupled directly to a ground terminal of said main power source.

5. The device as claimed in claim 1 further comprising a second high frequency magnetic choke element mounted on a second electrical conductor connecting said main power source to said material to be processed and wherein a second terminal of said capacitor is coupled to said second electrical conductor between said main power source and said second electrical conductor.

6. The device as claimed in claim 1 in which said high frequency magnetic choke element comprises a plurality of stacked discs in the form of a cylinder, each of said discs having a central hole and having an outside diameter at least 1.2 times the inside diameter thereof and a thickness of at most 10 mm.

7. The device as claimed in claim 1 in which said electrode comprises a welding electrode and said material to be processed is a material to be welded.

8. A device with a high frequency, contactless type arc igniting mechanism which comprises:

an electrode disposed confronting an electrically conductive material to be processed therewith through an electric discharge gap;

a main power source for supplying an arc discharge current between said electrode and said material;

a first electrical conductor connecting a first terminal of said main power source to said electrode and a second electrical conductor conecting a second terminal of said main power source to said material;

a high frequency electric source for applying a high-frequency high voltage between said electrode and said material to generate a high frequency discharge for arc ignition in said electric discharge gap;

a current limiting resistor;

an auxiliary power source for applying a voltage higher than that of said main power source between said electrode and said material through said current limiting resistor, to maintain an arc in said electric discharge gap;

a coupling coil for superposing said high frequency high voltage from said high frequency electric source on a current supplying wire extending from said auxiliary power source to said electrode;

a high frequency magnetic choke element surrounding a predetermined part of said first electrical conductor for blocking transmission of said high-frequency high voltage to said main power source, said high frequency magnetic choke element comprising a plurality of stacked ferrite discs in the form of a cylinder, each of said ferrite discs having a central hole, said first electrical conductor passing through said hole; and a high-frequency bypass capacitor connected in parallel with said main power source.

* * * * *